3,755,378
PREPARATION OF 3-FUROATE ESTERS
Bernard Beau Brown, Westfield and John Swidinsky, Newark, N.J., assignors to CPC International Inc.
No Drawing. Filed Oct. 22, 1970, Ser. No. 83,216
Int. Cl. C07d 5/16
U.S. Cl. 260—347.5                13 Claims

ABSTRACT OF THE DISCLOSURE

A method for the preparation of 3-furoate esters including the cyclization of levulinic esters in which the keto group is blocked by a ketal or acetal group and in which a 2-formyl group has been reacted with aqueous sodium bisulfite. The furoate esters are useful as intermediates in the preparation of insecticidal materials.

---

This invention relates to a method for the preparation of 3-furoate esters comprising preparing and cyclizing certain levulinic esters. It relates to the cyclization of levulinic esters in which the keto group is blocked by a ketal group and in which a 2-formyl group has been reacted with aqueous sodium bisulfite. The furoate esters which result from the practice of this invention are useful as intermediates in the preparation of the insecticidal esters described and claimed in U.S. Pat. 3,465,007. These insecticidal esters are notably effective against a wide variety of insects and especially against houseflies.

The above insecticidal esters are prepared by esterification of crysanthemic or pyrethric acids with a benzyl furylmethyl alcohol. Particularly preferred are the 5-benzyl-3-furylmethyl alcohols.

Chyrsanthemic and pyrethric acids correspond to the structural formula below:

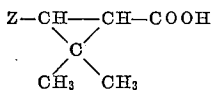

where Z, in the case of chrysanthemic acid, is isobutenyl and, in the case of pyrethric acid, is 2-carbethoxy-prop-1-enyl. Chrysanthemic acid is commercially available and methods for the preparation of pyrethric acid are well known.

The 5-benzyl-3-furylmethyl alcohols, on the other hand, require a rather elaborate method of synthesis and they are accordingly quite expensive. They may be prepared by the method disclosed in U.S. Pat. 3,466,304, but as indicated this method is elaborate, requiring many steps, some of which do not produce good yields of product. The effectiveness of these insecticidal esters is so remarkable that it is highly desirable that an efficient, economical method for their preparation be available.

It is accordingly a principal object of the present invention to render more efficient the overall process for the preparation of 5-benzyl-3-furylmethyl alcohols.

It is also an object of the present invention to provide a method of separating 4-ketal valerates from mixtures of such compounds and 4-ketal-2-formyl valerates.

It is also an object of the present invention to provide an improved process for the preparation of 3-furoate esters from ketals of 2-formyl levulinic acid esters.

It is also an object of the present invention to provide an improved process for the preparation of 3-furoate esters.

It is also an object of the present invention to provide an improved process for the cyclization of ketals of 2-(sodiosulfonatehydroxymethylene)levulinic acid esters.

These and other objects of the invention are accomplished by a process for the preparation of 3-furote esters comprising treating a 4-ketal of a 2-formyl levulinic acid ester with an alkali metal bisulfite to form a 2-hydroxy sulfonic acid salt and reacting said sulfonic acid salt with a strong mineral acid. The process is characterized by unexpectedly high yields of the desired 3-furoate esters; furthermore, the process is simple to carryout and results in a product of high purity. Still further, it provides a convenient means of recovering the unreacted 4-ethylenedioxy valerate from the reaction of that compound with a formylating agent. Such unreacted starting material can amount to as much as 10% of the reaction product, so that its recovery is an important economic consideration. The 3-furoate esters are, as indicated, useful in the preparation of 5-benzyl-3-furylmethyl alcohols which in turn are used in the preparation of extremely effective insecticides.

As mentioned earlier, the process is notably useful in the overall synthesis of certain insecticidal esters, and for this use it is particularly desirable that the levulinic acid esters used in the process contain an aryl substituent on the 5-carbon atom. In particular, the 5-phenyl substituted compounds are contemplated. Other aryl groups which may be thus employed include tolyl, xylyl, xenyl, naphthyl and the like.

Levulinic acid has the following structural formula:

$$CH_3COCH_2CH_2COOH$$

The ethylene ketal of a levulinic acid ester has the structural formula:

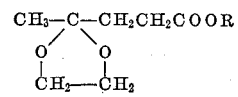

In some instances herein, derivatives of the above may be referred to as substituted valeric acid esters in other instances as substituted levulinic acid esters, but no distinction is thereby denoted. The difference in terminology serves merely the purpose of convenient nomenclature.

The conversion of the 2-formyl levulinic acid ester to its bisulfite addition product and thence to the corresponding 3-furoate ester is illustrated as follows:

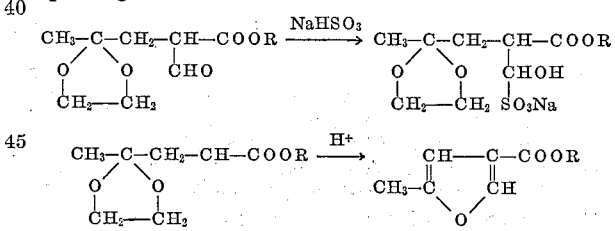

where R is alkyl or phenyl. The above equations are as indicated only illustrative. Ordinarily, the 5-carbon atom has an aryl substituent; also, the ketal group shown is an ethylene ketal and it may also be propylene or any lower alkylene. Likewise, the sodium bisulfite may be substituted by other alkali metal bisulfites.

The 4-ketal-2-formyl valeric acid ester ordinarily is a lower alkyl ester, although in certain instances it may be desirable to use a higher alkyl ester or a phenyl ester. Lower alkyl groups contemplated include those having up to 6 carbon atoms, e.g., methyl, ethyl, propyl, butyl and amyl esters. The ethyl ester is most commonly used because of its relatively ready availability.

The alkali metal bisulfite ordinarily is sodium bisulfite althought the potassium and lithium bisulfites likewise are useful, and in certain instances, may be especially effective.

The reaction of the 4-ketal-2-formyl valeric acid ester with an alkali metal bisulfite is carried out conveniently merely by mixing an aqueous solution of the bisulfite with the ester, preferably with agitation, and then when the two liquid phases have become miscible, the resulting solution is extracted with an organic solvent such as toluene. The toluene extract contains any nonsulfonate material and the residue contains the hydroxy sulfonate material. The reaction takes place without the necessity of any external heat and is in fact slightly exothermic. If desired, the exothermic reaction may be cooled so as to maintain the temperature at any desired level, but the heat generated by the reaction ordinarily is slight such that external cooling usually is unnecessary. The reaction may be carried out quite satisfactorily at ambient temperature and, if unusually large quantities of reactants are used, if the particular reactants are such to cause a vigorously exothermic reaction, then the temperature may be controlled so as to stay within the range of about 20° C. to about 50° C.

The organic solvent used to extract the above reaction mixture may be any inert, relatively non-polar solvent. Toluene is preferred, but other such solvents may be used satisfactorily, including benzene, xylene, chloroform, carbon tetrachloride, trichloroethylene, chlorobenzene and the like.

The strong mineral acid which is used to convert the 2-hydroxy sulfonic salt to the corresponding furoate ester may be sulfuric acid, phosphoric acid, hydrochloric acid or any other strong mineral acid. Concentrated acids are preferred, and concentrated sulfuric acid is particularly preferred. This reaction likewise is desirably carried out within the range of about 20° C. to about 50° C. It also is exothermic usually more so than the reaction of the first step, so that it generally is advisable to cool the reaction externally so as to maintain the temperature within the above desired range. By concentrated sulfuric acid is meant sulfuric acid of at least 50% by weight.

The process of the invention is illustrated by the following examples which, however, are not to be taken as limited in any respect. All parts are by weight, unless otherwise expressly stated.

EXAMPLE 1

Preparation of ethyl 2-(sodio)hydroxymethylene-4-ethylenedioxy-5-phenyl valerate To 200 ml. of dry toluene there is added 2.5 g. (0.110 mole) of sodium metal and the air in the flask is displaced with nitrogen and the nitrogen atmosphere maintained throughout the entire subsequent reaction. The toluene-sodium mixture is heated with stirring until the sodium melts and is dispersed into small droplets. To this stirred hot mixture there is added slowly 10 ml. of anhydrous ethanol. When all of the sodium has disappeared the excess alcohol is removed by distillation. The resulting alcohol-free sodium ethylate is cooled to 25° C. whereupon 25.0 g. (0.095 mole) of ethyl 4-ethylenedioxy-5-phenyl valerate and 14.8 g. (0.2 mole) of ethyl formate are added. This mixture is stirred at room temperature for 4 days whereupon the ethyl formate reacts at the 2-carbon atom of the ethyl 4-ethylenedioxy-5-phenyl valerate. The resulting ethyl 2-(sodio)hydroxymethylene-4-ethylenedioxy-5-phenyl valerate is isolated by filtration; the yield of solid product is 28.8 g.

EXAMPLE 2

Conversion of ethyl 2 - (sodio)hydroxymethylene - 4-ethylenedioxy - 5 - phenyl valerate to ethyl 2 - formyl-4-ethylenedioxy-5-phenyl valerate To a slurry of 15.7 g. (0.05 mole) of ethyl 2-(sodio)-hydroxymethylene-4-ethylenedioxy-5 - phenyl valerate in about 100 ml. of benzene there is added 100 ml. of a 3% aqueous hydrochloric acid solution. The resulting mixture is stirred for several minutes, the benzene layer separated, washed with water, dried over sodium sulfate, and distilled to yield 8.0 g. (54.5% of the theory) of ethyl 2-formyl-4-ethylenedioxy - 5 - phenyl valerate, B.P. 150° C./0.4 mm.

EXAMPLE 3

Conversion of ethyl 2-formyl-4-ethylenedioxy-5-phenyl valerate to its sodium bisulfite addition product To a solution of 29.2 g. (0.1 mole) of ethyl 2-formyl-4-ethylenedioxy-5-phenyl valerate in 80 ml. of toluene there is added a solution of 20.8 g. (0.2 mole) of sodium bisulfite and 20 ml. of water. The resulting mixture is stirred for one hour and the aqueous layer is isolated. After standing for 48 hours, a crystalline precipitate settles out from the aqueous layer and is removed by filtration, then is washed with cold water and dried. The precipitate weighs 16.2 g., M.P. 142°–144° C. Infrared analysis confirms the structure as that of sodium 1-hydroxy-2-carbethoxy-4-ethylenedioxy-5 - phenyl pentane sulfonate.

EXAMPLE 4

Conversion of sodium 1-hydroxy-2-carbethoxy-4-ethylenedioxy - 5 - phenyl pentane sulfonate to ethyl 5-benzyl-3-furoate A solution of 19.8 g. (0.05 mole) of sodium 1-hydroxy-2-carbethoxy-4-ethylenedioxy-5-phenyl pentane sulfonate in 20 ml. of water is covered with 80 ml. of toluene whereupon 142 ml. of 90% aqueous sulfuric acid is added with cooling so as to maintain the temperature below 30° C. This mixture is stirred for one hour whereupon the sulfuric acid layer is removed. The residual toluene solution is washed with saturated sodium bicarbonate and then distilled to yield 11.0 g. (96% of the theory) of ethyl 5-benzyl-3-furoate, B.P. 115°–120° C.

EXAMPLE 5

Preparation of ethyl 5-benzyl-3-furoate from impure ethyl-4-ethylenedioxy-2-formyl-5-phenyl valerate To 29.2 g. (0.1 mole) of impure ethyl 4-ethylenedioxy-2-formyl-5-phenyl valerate (obtained by the formylation of ethyl-4-ethylenedioxy-5-phenyl valerate) there is added a solution of 20.9 g. (0.2 mole) of sodium bisulfite in 40 ml. of water. The two immiscible liquid phases soon blend into one solution with the evolution of a slight amount of heat. This solution is extracted with toluene to yield a toluene extract and an aqueous residue. The aqueous residue is covered with 80 ml. of toluene and 142 ml. of 90% aqueous sulfuric acid is added with cooling so as to maintain the temperature below 30° C. The resulting mixture is stirred vigorously for one hour whereupon the sulfuric acid layer is removed. The toluene solution is washed with saturated aqueous sodium bicarbonate and distilled to yield 15 g. (65% of the theory) of the desired ethyl-5-benzyl-3-furoate.

EXAMPLE 6

Recovery of ethyl 4-ethylenedioxy-5-phenyl valerate from its formylation reaction mixture The toluene extract obtained as in the preceding example is evaporated at reduced pressure to a residue which is shown, by means of gas-liquid chromatography and infrared analysis, to be ethyl-4-ethylenedioxy-5-phenyl valerate.

The ethyl-5-benzyl-3-furoate obtained as in Example 4 or 5 may be converted to the corresponding 3-furylmethyl alcohol by treatment with lithium aluminum hydride in ethyl ether (as described in U.S. Pat. 3,466,304) and this alcohol then esterified with chrysanthemoyl chloride (as described in U.S. Pat. 3,465,007) to yield an ester having very effective insecticidal activity.

While the invention has been described in connection with specific embodiments thereof, it will be understood that it is capable of further modification, and this application is intended to cover any variations, uses, or adaptations of the invention following, in general, the principles of the invention and including such departures from the

What is claimed is:

1. A process for the preparation of 5-aryl-3-furoate esters comprising reacting a 5-phenyl-4-ketal-2-formyl valeric acid wherein the ketal is lower alkylene ester with an alkali metal bisulfite to form a 2-hydroxy sulfonic acid salt, and reacting said sulfonic acid salt with a strong mineral acid.

2. The process of claim 1 wherein the 4-ketal-2-formyl valeric acid ester is a lower alkyl ester.

3. The process of claim 1 wherein the alkali metal bisulfite is sodium bisulfite.

4. The process of claim 1 wherein the alkali metal bisulfite is present as an aqueous solution.

5. The process of claim 1 wherein the reaction of the 4-ketal-2-formyl valeric acid ester with an alkali metal bisulfite is carried out at ambient temperature.

6. The process of claim 1 wherein the reaction of the 4-ketal-2-formyl valeric acid ester with an alkali metal bisulfite is carried out at a temperature within the range of from about 20° C. to about 50° C.

7. The process of claim 1 wherein the 2-hydroxy sulfonic acid salt is extracted with toluene prior to reaction with the strong mineral acid.

8. The process of claim 1 wherein the strong mineral acid is sulfuric acid.

9. The process of claim 1 wherein the strong mineral acid is concentrated sulfuric acid.

10. The process of claim 1 wherein the reaction of the 2-hydroxy sulfonic acid salt with a strong mineral acid is carried out at a temperature within the range of from about 20° C. to about 50° C.

11. Process for the preparation of 3-furoate esters comprising reacting a lower alkyl ester of 5-phenyl-4-ethylenedioxy-2-formyl valeric acid with an aqueous solution of sodium bisulfite to form the corresponding 2-hydroxy sulfonic acid salt, and reacting said sulfonic salt with a strong mineral acid.

12. The process of claim 11 wherein the strong mineral acid is sulfuric acid.

13. A process of claim 11 wherein the reaction is carried out at a temperature within the range of from about 20° C. to about 50° C.

References Cited

UNITED STATES PATENTS

| 3,466,304 | 9/1969 | Elliot et al. | 260—347.8 |
| 3,567,744 | 3/1971 | Tanaka et al. | 260—347.5 |

OTHER REFERENCES

Fieser and Fieser, Advanced Organic Chemistry, New York, Reinhold Pub. Co. (1961), pp. 416–18.

R. G. Jones, J.A.C.S. (1955), vol. 77, pp. 4069–73.

ALEX MAZEL, Primary Examiner

U.S. Cl. X.R.

260—340.9

UNITED STATES PATENT OFFICE
CERTIFICATE OF CORRECTION

Patent No. 3,755,378    Dated Aug. 28, 1973

Inventor(s) Bernard B. Brown and John Swidinsky

It is certified that error appears in the above-identified patent and that said Letters Patent are hereby corrected as shown below:

In the formula, column 2, starting with line 41,

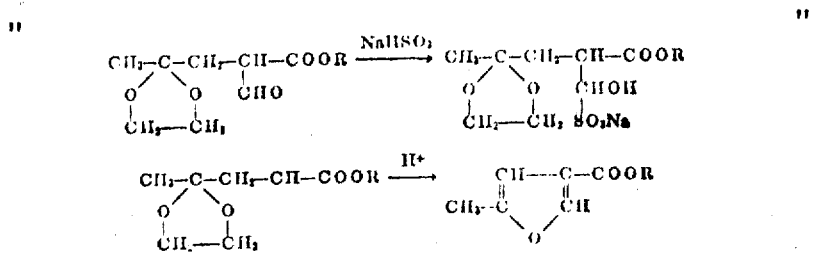

should be----------

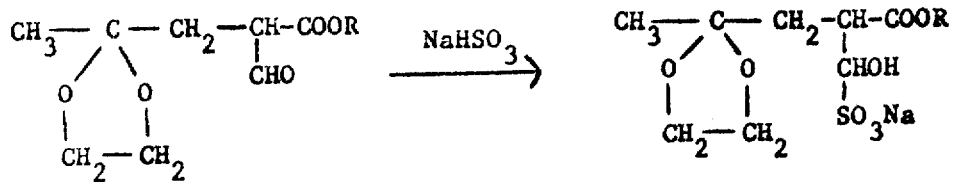

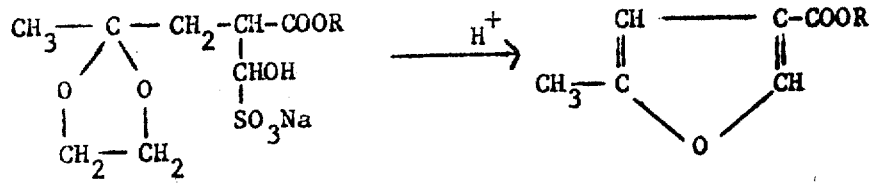

Signed and sealed this 1st day of January 1974.

(SEAL)
Attest:

EDWARD M. FLETCHER, JR.
Attesting Officer

RENE D. TEGTMEYER
Acting Commissioner of Patents